US012385633B1

(12) United States Patent
Shen

(10) Patent No.: US 12,385,633 B1
(45) Date of Patent: Aug. 12, 2025

(54) ACOUSTIC LAMP WITH HANDLE

(71) Applicant: NINGBO JOWE IMP&EXP CO., LTD, Zhejiang (CN)

(72) Inventor: Guoqiang Shen, Zhejiang (CN)

( * ) Notice: Subject to any disclaimer, the term of this patent is extended or adjusted under 35 U.S.C. 154(b) by 0 days.

(21) Appl. No.: 18/735,322

(22) Filed: Jun. 6, 2024

(51) Int. Cl.
*F21V 23/04* (2006.01)
*F21V 21/40* (2006.01)
*F21V 23/02* (2006.01)
*F21V 33/00* (2006.01)

(52) U.S. Cl.
CPC ........ *F21V 23/0428* (2013.01); *F21V 21/406* (2013.01); *F21V 23/023* (2013.01); *F21V 33/0056* (2013.01)

(58) Field of Classification Search
CPC .... F21V 33/056; F21V 21/406; F21V 23/023; F21V 23/0428
See application file for complete search history.

(56) References Cited

U.S. PATENT DOCUMENTS 11,041,612 B1 * 6/2021 Donnan ................ F21V 7/0075
11,162,669 B1 * 11/2021 Donnan .............. F21V 21/0965
11,859,781 B1 * 1/2024 Liu ..................... F21V 23/0414

OTHER PUBLICATIONS

Innovation Q+ NPL Search (Year: 2024).*

* cited by examiner

*Primary Examiner* — Anabel Ton
(74) *Attorney, Agent, or Firm* — Hawaii Patent Services; Nathaniel K. Fedde; Kenton N. Fedde

(57) ABSTRACT

An acoustic lamp with a handle comprises a handle, a lamp body and a power supply; the handle is arranged on the lamp body and is rotatably connected with the lamp body, the power supply is fixedly arranged in the lamp body, and the lamp body further comprises a light emitting module and a light control component; the lighting control component comprises a control wheel and an elastic button, wherein the control wheel is fixedly connected to the handle and abuts against the elastic button; the control wheel further comprises a convex part, and when the control wheel is driven to rotate by the handle, the elastic button has a compressed state abutting against the convex part and an extended state disengaging from the convex part; wherein, the light emitting module is electrically connected with the power supply through the elastic button.

20 Claims, 10 Drawing Sheets

ACOUSTIC LAMP WITH HANDLE

TECHNICAL FIELD

The present invention relates to the technical field of lamps, in particular to an acoustic lamp with a handle.

BACKGROUND

The existing acoustic lamps in the market have both audio and lighting functions, however, they often rely on the traditional way of pressing or twisting the button when operating the light switch. This operation mode is not convenient and fast in practical use, especially when the lighting state needs to be adjusted quickly or in a dark environment, users may need to spend extra time and energy to find and accurately press or twist the corresponding button. For example, a portable Bluetooth camping lamp disclosed in U.S. Pat. No. 14,256,774 needs to twist a specific button to control the switch of the camping lamp; similarly, a multifunctional Bluetooth lighting device disclosed in U.S. Pat. No. 15,801,479 requires pressing a specific button to control the switch of the camping lamp, which is inconvenient.

Based on this, it is necessary to put forward a new type of acoustic lamp. The control mode of the acoustic lamp makes it easier to turn on, turn off and adjust the light, which is more in line with the needs of modern people.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides an acoustic lamp with a handle, which includes a handle, a lamp body and a power supply;

wherein the handle is arranged on the lamp body and is rotatably connected with the lamp body, the power supply is fixedly arranged in the lamp body, and the lamp body further comprises a light emitting module and a light control component;

the lighting control component comprises a control wheel and an elastic button, wherein the control wheel is fixedly connected to the handle and abuts against the elastic button;

the control wheel further comprises a convex part, and when the control wheel is driven to rotate by the handle, the elastic button has a compressed state abutting against the convex part and an extended state disengaging from the convex part;

wherein, the light emitting module is electrically connected with the power supply through the elastic button, and a circuit between the power supply and the light emitting module can be disconnected and connected by pressing the elastic button.

The present invention further provides an acoustic lamp with a handle, which includes a handle, a lamp body and a power supply;

wherein the handle is arranged on the lamp body and is rotatably connected with the lamp body, the power supply is fixedly arranged in the lamp body, and the lamp body further comprises a light emitting module, a lighting control component and a positioning component;

the lighting control component comprises a control wheel and an elastic button, wherein the control wheel is fixedly connected to the handle and abuts against the elastic button, and the light emitting module is electrically connected with the power supply through the elastic button;

the positioning component comprises a positioning clamp, a positioning part and a tooth part, wherein the positioning clamp is fixedly arranged in the lamp body; a positioning groove is arranged at one end of the positioning clamp close to the control wheel; the positioning part is arranged in the positioning groove; and the tooth part is arranged at one end of the control wheel close to the positioning clamp and is engaged with the positioning part.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the figures.

Figure 1:
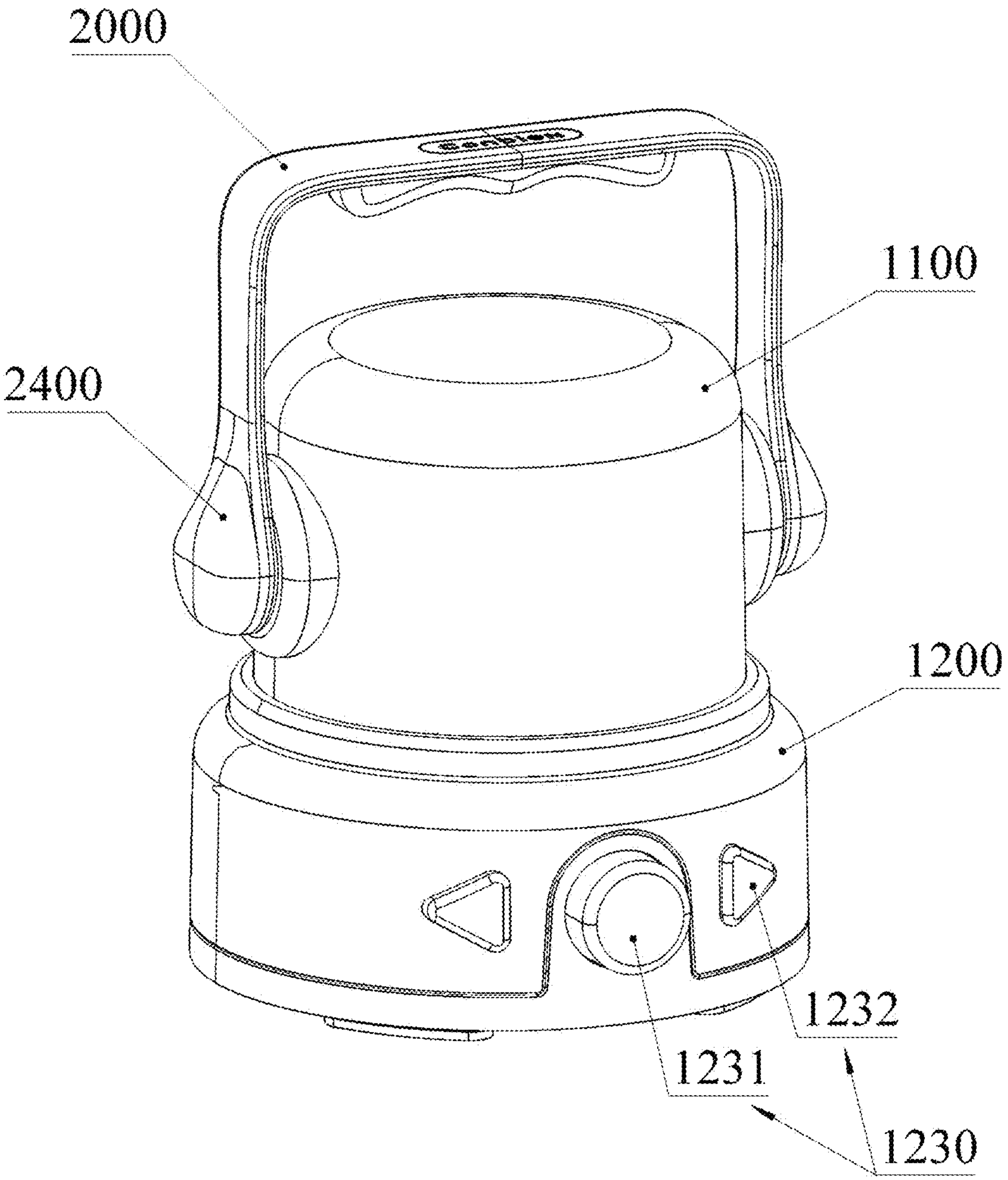
FIG. 1 is a schematic view of an acoustic lamp with a handle.

Lamp body (1000); Lampshade (1100); Clamp through hole (1110); Embedding groove (1120); Second fixing hole (1130); Limit hole (1121); Base (1200); Base housing (1210); First fixing hole (1211); Bottom plate (1220); Second fixing boss (1221); Fourteenth fixing hole (1222); Third fixing boss (1223); Seventh fixing hole (1224); Annular groove (1225); Control component (1230); Knob (1231); Key (1232); Upper cover plate (1300); Third fixing hole (1310); First fixing boss (1320); Fourth fixing hole (1321); Lamp cap part (1330); Fifteenth fixing hole (1331); Acoustic chamber (1400); Upper shell (1410); Eighth fixing hole (1411);

Upper acoustic opening (1412); Vibrating membrane (1413); Protective cover (1414); Twelfth fixing hole (1415); Thirteenth fixing hole (1416); Lower shell (1420); Sixth fixing hole (1421); Lower acoustic opening (1422); Annular boss (1423); Sound outlet (1424); Ninth fixing hole (1425); Eleventh fixing hole (1426); Acoustic module (1500); Tenth fixing hole (1510); Handle (2000); First buckle through hole (2100); Positioning clamp (2200); Second fixed buckle protrusion (2210); Snap ring groove (2220); Blocking part (2230); Fixed disk (2300); Second buckle through hole (2310); Limit post (2320); Back cover (2400); Fixing post (2410); Buckle groove (2420); Fourth fixed buckle protrusion (2500); Fixing groove (2600); Lighting control component (3000); Light emitting module (3100); Fifth fixing hole (3110); Elastic control part (3200); Elastic button (3210); Transmission pressing part (3220); Sliding guide groove (3221); Abutting groove (3222); Control wheel (3300); Convex part (3310); Wheel part (3320); First fixed buckle protrusion (3330); Third fixed buckle protrusion (3340); Positioning post (3350); Positioning component (3400); Positioning part (3410); Tooth part (3420); Positioning groove (3430); Power supply (4000); Charging port (4001).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

Figure 2:
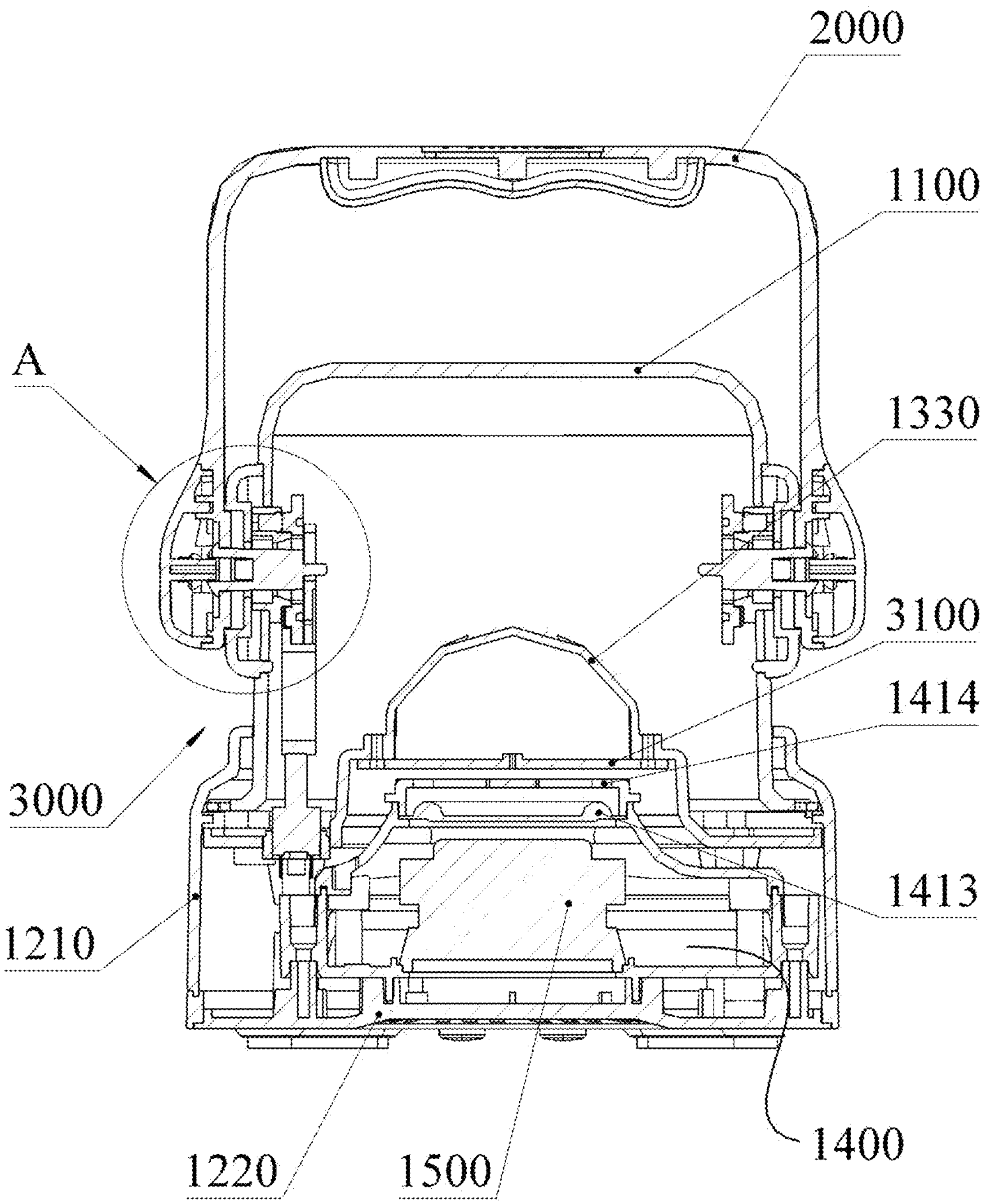
FIG. 2 is a sectional view of FIG. 1.
Figure 3:
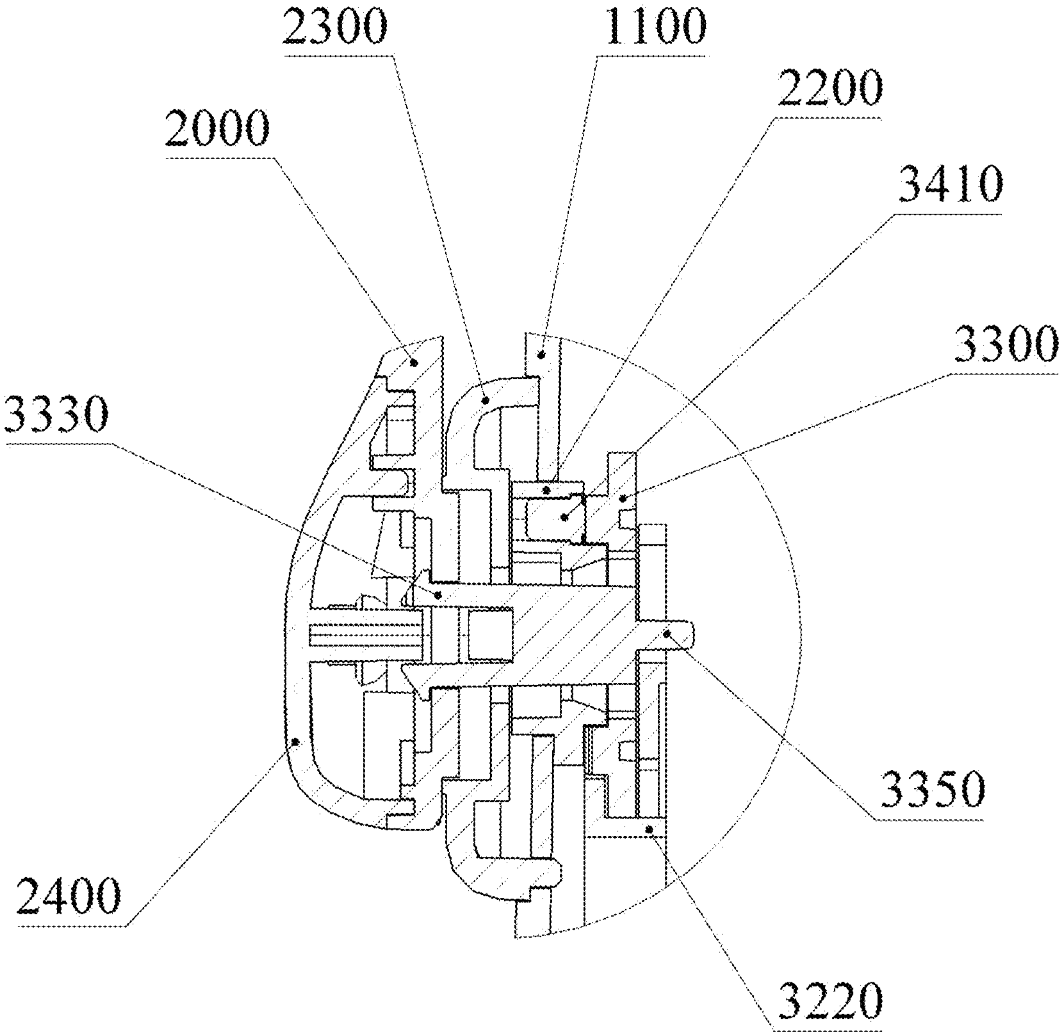
FIG. 3 is an enlarged schematic view at A in FIG. 2.
Figure 4:
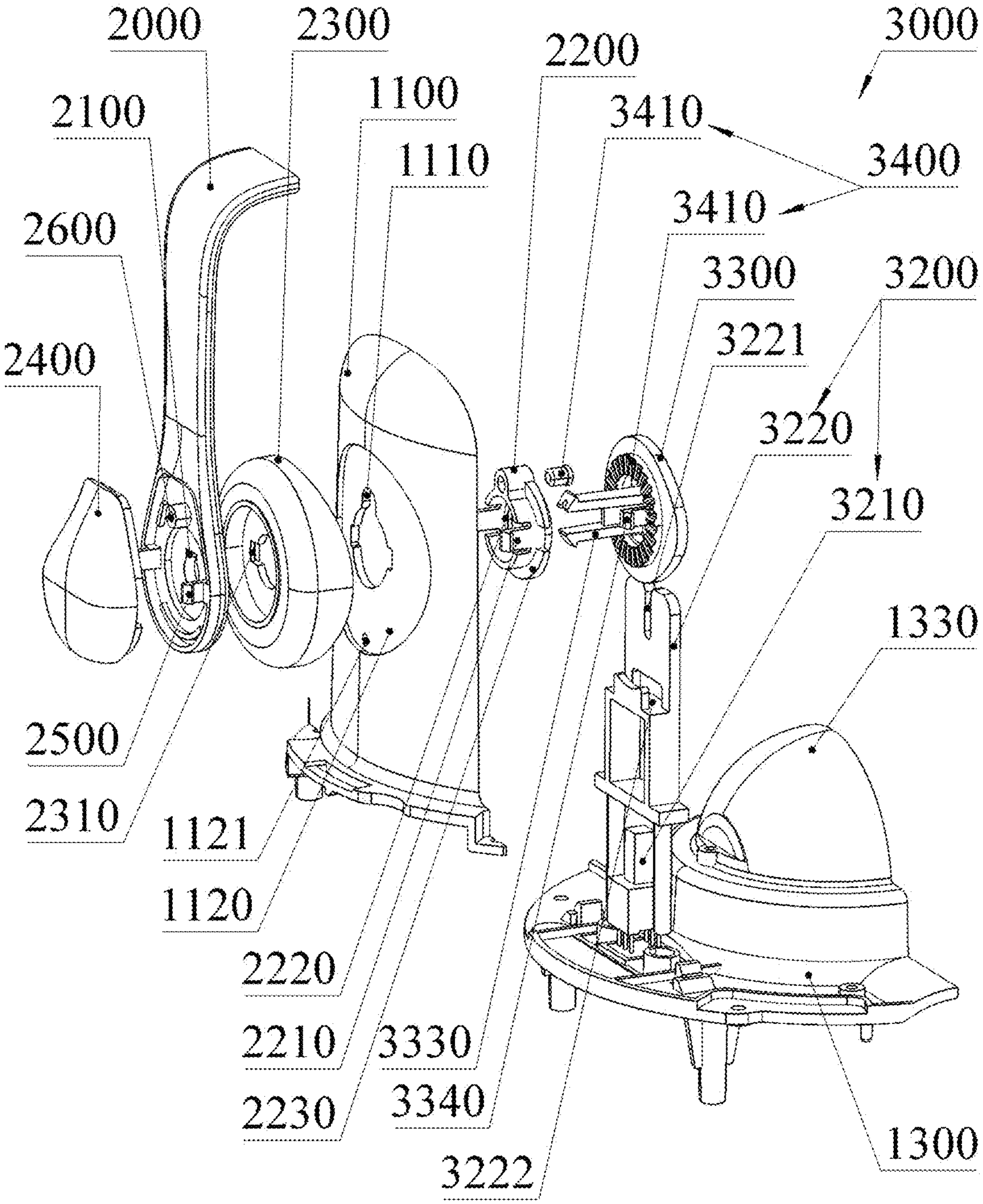
FIG. 4 is a partial exploded view of the light control component.
Figure 5:
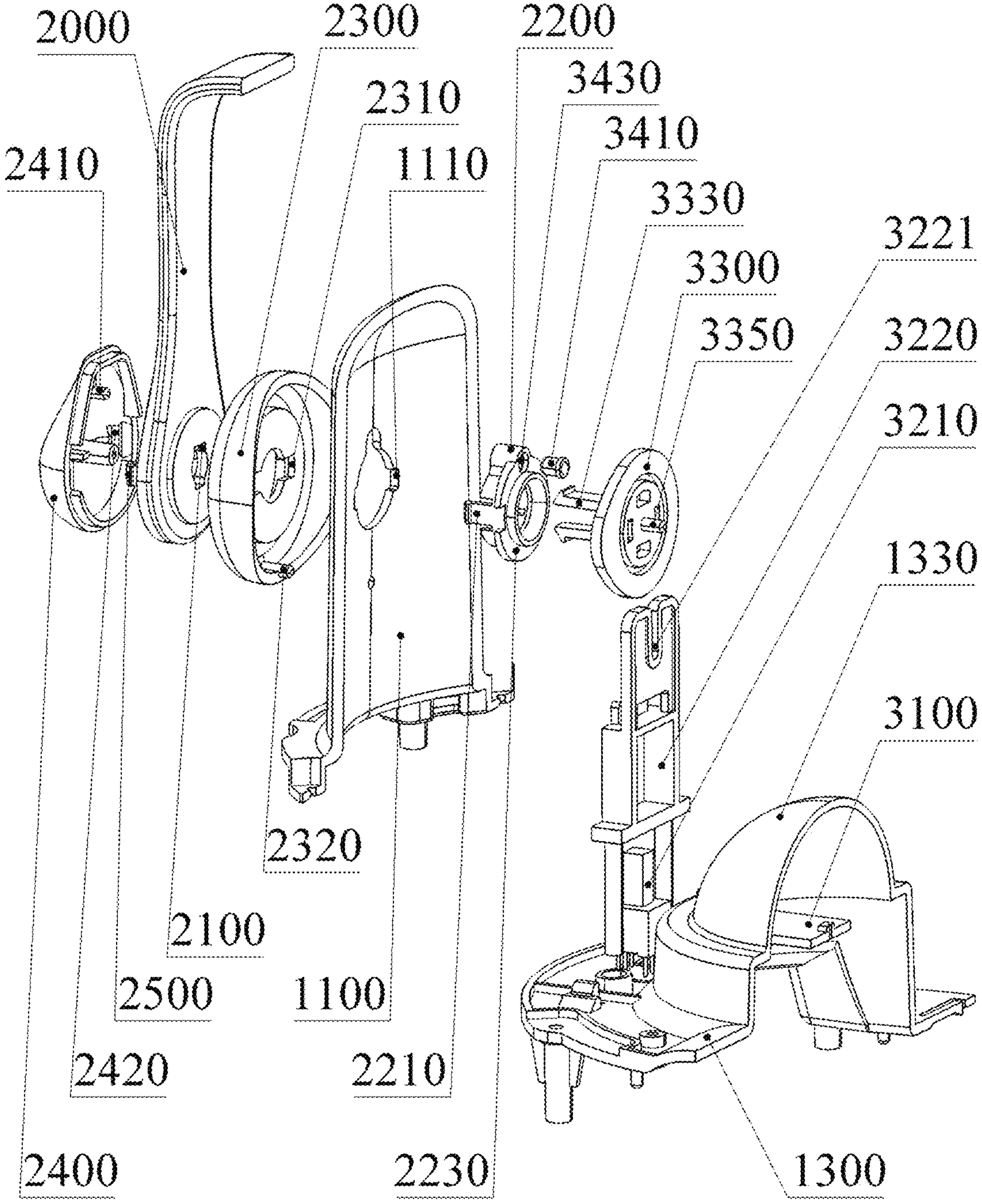
FIG. 5 is another schematic view of FIG. 4.
Figure 10:
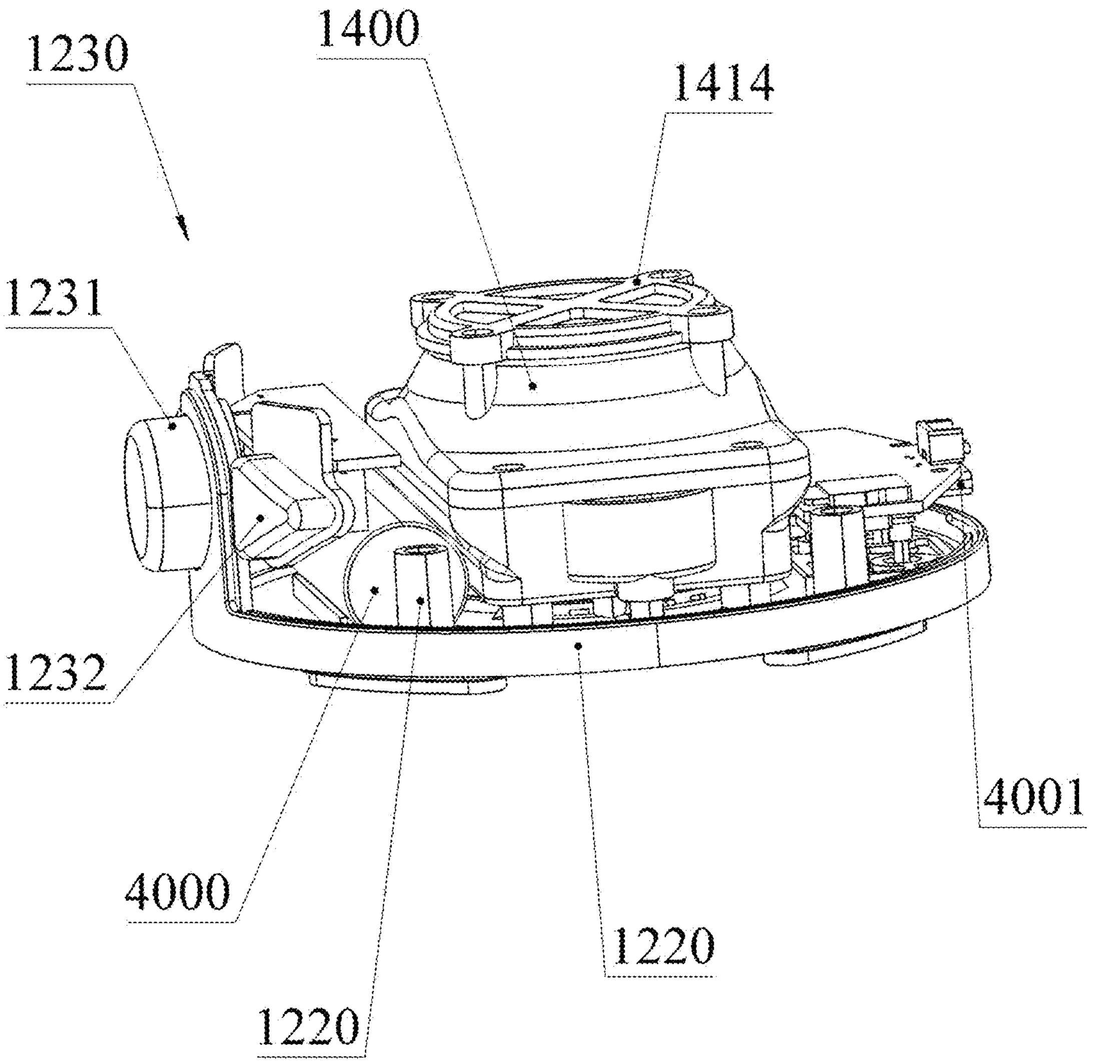
FIG. 10 is a partial schematic view of the base.

As shown in FIGS. 1, 2 and 10, the present invention provides an acoustic lamp with a handle, which comprises a handle 2000, a lamp body 1000 and a power supply 4000; The handle 2000 is arranged on the lamp body 1000 and rotatably connected with the lamp body 1000, and the power supply is fixedly arranged in the lamp body 1000; the lamp body 1000 further comprises a light emitting module 3100 and a light control component 3000; the lighting control component 3000 comprises a control wheel 3300 and an elastic button 3210, wherein the control wheel 3300 is fixedly connected to the handle 2000 and abuts against the elastic button 3210; the control wheel 3300 also includes a protrusion 3310, and when the control wheel 3300 is driven to rotate by the handle 2000, the elastic button 3210 has a compressed state abutting against the convex part 3310 and an extended state disengaging from the protrusion.

Wherein the light emitting module 3100 is electrically connected with the power supply 4000 through the elastic button 3210, and the circuit between the power supply 4000 and the light emitting module 3100 can be disconnected and connected by pressing the elastic button 3210.

The housing of the lamp body can be made of an anti-drop and durable ABS plastic material, and the surface is frosted or sprayed to improve its scratch resistance and durability. Heat dissipation structures, such as cooling fins or cooling holes, can be designed inside the lamp body to ensure the stable performance of the acoustic lamp when it is used for a long time.

As shown in FIG. 10, the lamp body 1000 is also provided with a charging port 4001. In some embodiments (not shown in the figure), in order to improve the endurance of acoustic lamps, lithium batteries with a high energy density may be used as power supply, and an intelligent charging management system is designed inside the lamp body. The system can monitor the battery charge and charging status in real time, and automatically start the charging mode when the battery charge is insufficient. At the same time, in order to facilitate users to charge, a USB-C interface or wireless charging module may be designed on the lamp body to support fast charging and wireless charging functions.

As shown in FIGS. 1 and 2, in this embodiment, the light control component 3000 includes an elastic control part 3200 and a control wheel 3300; the elastic control part 3200 is fixed in the lamp body 1000 and electrically connected with the light emitting module 3100; the control wheel 3300 is fixedly connected to the handle 2000 and abuts against the elastic control part 3200; the control wheel 3300 includes a convex part 3310 and a wheel part 3320, and the control wheel 3300 abuts against the elastic control part 3200 through the convex part 3310 and the wheel part 3320, so that the elastic control part 3200 is in a compressed state or an extended state.

When the handle 2000 is rotated, and the convex part 3310 abuts against the elastic control part 3200, the elastic control part 3200 is in a compressed state and the light emitting module 3100 is turned on; when the wheel part 3320 abuts against the elastic control part 3200, the elastic control part 3200 is in an extended state and the light emitting module 3100 is turned off.

In this embodiment, the turn-on and turn-off of the light is controlled by rotating the handle, so that the user does not need to look for additional switch buttons, which greatly improves the convenience of operation. The combination of the handle and the light control component makes the whole acoustic lamp more concise in appearance, reduces redundant design elements and increases the practicability of the product. When the user does not use the light, the light can be turned off simply by turning the handle, thus avoiding unnecessary power consumption and achieving the effects of energy saving and environmental protection. Because of the design of the elastic control part and control wheel, the lighting control is more stable and reliable, and the accidental opening or closing caused by misoperation or external interference is avoided.

In other embodiments (not shown in the figure), a plurality of contact points are arranged on the elastic control part, and the multi-level adjustment of the light brightness is realized by the contact of different positions of the control wheel with these contact points. In this way, users can adjust the most suitable lighting brightness according to different environments and needs.

In other embodiments (not shown in the figure), an audio system, such as a speaker and an audio playback module, is integrated in the lamp body. Users can connect their mobile phones or other devices through Bluetooth and Wi-Fi, and play music. At the same time, the lighting can be set to change with the rhythm of music to enhance the user's audio-visual experience.

In other embodiments (not shown), a wireless charging coil is arranged at the bottom of the lamp body, so that the acoustic lamp can support the wireless charging function. Users only need to place the equipment supporting wireless charging at the bottom of the lamp body to realize wireless charging.

In other embodiments (not shown in the figure), in order to meet the needs and preferences of different users, a variety of handles with different shapes, materials and colors can be designed for users to choose from. For example, a retractable handle design can be adopted to adapt to users of different heights; or a detachable handle design is adopted, which is convenient for users to replace according to different usage scenarios.

In other embodiments (not shown in the figure), intelligent control modules are integrated, such as voice recognition, gesture recognition, etc. Users can control the functions of lighting on and off, brightness level and music playing by voice or gesture. In this way, it not only improves the intelligence of the product, but also makes the user's operation more natural and convenient.

As shown in FIGS. 2 to 5, in this embodiment, the lamp body 1000 includes a lampshade 1100 and a base 1200. An upper cover plate 1300 is arranged in the base 1200, and the upper cover plate 1300 is fixedly connected with the lampshade 1100. The elastic control part 3200 includes an elastic button 3210 and a transmission pressing part 3220. The elastic button 3210 is arranged between the transmission pressing part 3220 and the upper cover plate 1300, and the elastic button 3210 is electrically connected with the light emitting module 3100.

The lamp body consists of a lampshade and a base, and the lampshade is used for protecting the light emitting module and providing a beautiful appearance. As the basic part of the lamp body, the base not only supports the weight of the whole acoustic lamp, but also integrates several functional components. Inside the base, there is an upper cover plate, which is fixedly connected with the lampshade by screws, buckles or other means to ensure its stability.

The elastic control part consists of an elastic button and a transmission pressing part. The transmission pressing part is a component that can move up and down. It passes through the upper cover plate, with one end abutting against the control wheel and the other end contacting with the elastic button. When the control wheel rotates, the convex part or wheel part on it will push the transmission pressing part to move up and down.

The elastic button is arranged between the transmission pressing part and the upper cover plate, and there is a certain elastic gap between it and the transmission pressing part, so as to ensure that the transmission pressing part can generate enough elastic force when it is acted by external force. The elastic button is electrically connected with the light emitting module through wires or other ways to realize the function of controlling the light emitting module to turn on or off.

In this embodiment, the circuit between the power supply 4000 and the light emitting module 3100 can be disconnected and connected by pressing the elastic button 3210. In other embodiments (not shown in the figure), the elastic button is not limited to controlling the circuit in this way, but can also be set to control the circuit in any desired way such as rheostat.

As shown in FIGS. 2 to 5, in this embodiment, the control wheel 3300 is formed with a first fixed buckle protrusion 3330 extending in the direction close to the handle 2000, and the handle 2000 is provided with a first buckle through hole 2100 corresponding to the first fixed buckle protrusion 3330, wherein the control wheel 3300 and the handle 2000 are detachably connected through the first fixed buckle protrusion 3330 and the first buckle through hole 2100.

In this embodiment, the connection mode between the control wheel and the handle of the acoustic lamp with the handle are optimized to realize more convenient and detachable connection. Specifically, a first fixed buckle protrusion is formed on the control wheel in the direction close to the handle, and a corresponding first buckle through hole is provided on the handle. Based on this, the control wheel and the handle can be detachably connected through the first fixed buckle protrusion and the first buckle through hole.

In this embodiment, the control wheel, as a key component connected with the handle and operating the light control component, is provided with a first fixed buckle protrusion on its side close to the handle. This protrusion can be cylindrical, flat or other shapes suitable for buckle, so as to ensure close fit with the buckle through hole on the handle.

On the handle, a first buckle through hole corresponding to the first fixed buckle protrusion is provided. The size and shape of this through hole need to match with the first fixed buckle protrusion to ensure the smooth engagement and separation of the two.

When the user needs to connect the control wheel with the handle, he only needs to align the first fixed buckle protrusion with the first buckle through hole, and then gently press or rotate the control wheel so that the buckle protrusion passes through the through hole and is clamped on the other side of the through hole. Similarly, when the user needs to disassemble the control wheel, he only needs to reverse the operation to make the buckle protrusion separate from the through hole.

As shown in FIGS. 2 to 5, in this embodiment, a positioning clamp 2200 and a fixed disk 2300 are arranged between the control wheel 3300 and the handle 2000, and a clamp through hole 1110 and an embedding groove 1120 are formed in the lampshade 1100; the clamp through hole 1110 corresponds to the positioning clamp 2200, and the positioning clamp 2200 penetrates through the clamp through hole 1110; the embedding groove 1120 corresponds to the fixed disk 2300, and the fixed disk 2300 is located in the embedding groove 1120; and a second fixed buckle protrusion 2210 is formed on the positioning clamp 2200 extending in the direction close to the handle 2000, and a second buckle through hole 2310 corresponding to the second fixed buckle protrusion 2210 is formed on the fixed disk 2300, wherein the positioning clamp 2200 and the fixed disk 2300 are detachably connected through the second fixed buckle protrusion 2210 and the second buckle through hole 2310.

In order to further improve the stability and dismountability of the acoustic lamp with the handle, this embodiment introduces the design of the positioning clamp and the fixed disk between the control wheel and the handle, which is combined with the clamp through hole and the fixing groove on the lampshade to realize a more stable and easily dismounted connection structure.

A positioning clamp is arranged between the control wheel and the handle, and the positioning clamp extends in the direction close to the handle and has enough length to pass through the lampshade. At the same time, the corresponding position on the lampshade is provided with a clamp through hole, and the size of the through hole is matched with the positioning clamp, so as to ensure that the positioning clamp can penetrate smoothly.

A fixed disk is arranged on the other side of the control wheel, and the fixed disk is arranged vertically or at a certain angle with the positioning clamp. At the same time, a fixing groove is opened at the corresponding position on the lampshade, and the shape and size of the fixing groove are matched with the fixed disk, so that the fixed disk can be stably embedded in the fixing groove.

A second fixed buckle protrusion is formed on the positioning clamp extending in the direction close to the handle, and a corresponding second buckle through hole is formed on the fixed disk. When the positioning clamp penetrates into the clamp through hole and rotates for a certain angle, the second fixed buckle protrusion will be clamped into the second buckle through hole, thus realizing the detachable connection between the positioning clamp and the fixed disk.

As shown in FIGS. 2 to 5, in this embodiment, the first fixed buckle protrusion 3330 penetrates into the positioning clamp 2200 and the fixed disk 2300, and the third fixed buckle protrusion 3340 is formed on the control wheel 3300 in the direction close to the positioning clamp 2200; and the positioning clamp 2200 is provided with a snap ring groove 2220 corresponding to the third fixed buckle protrusion 3340, wherein the positioning clamp 2200 and the control wheel 3300 are detachably connected through the third fixing buckle protrusion 3340 and the snap ring groove 2220.

In order to further enhance the stability and disassembly convenience of the acoustic lamp with handle, this embodiment introduces a new detachable connection structure between the control wheel, the positioning clamp and the fixed disk. This structure makes the connection between the control wheel, the positioning clamp and the fixed disk more stable and easy to disassemble through the cooperative use of the first fixed buckle protrusion, the third fixed buckle protrusion and the snap ring groove.

The first fixed buckle protrusion still penetrates through the positioning clamp and the fixed disk, and plays the role of preliminary fixing and connection. It ensures the stable connection between the positioning clamp and the fixed disk and provides basic support for the whole structure. On the control wheel, a third fixed buckle protrusion is formed extending in the direction close to the positioning clamp. This projection is specially designed to cooperate with the snap ring groove in the positioning clamp to further enhance the connection stability between the control wheel and the positioning clamp. In the positioning clamp, there is a snap ring groove corresponding to the third fixed buckle protrusion. The shape and size of the snap ring groove are matched with the third fixed snap projection, so that when the third fixed snap projection is inserted into the snap ring groove, a tight snap connection can be formed.

When assembling the acoustic lamp, firstly, the first fixed buckle protrusion is inserted into the positioning clamp and the fixed disk, then the positioning clamp is inserted into the clamp through hole on the lampshade, and the fixed disk is placed in the fixing groove of the lampshade. Next, the third fixed buckle protrusion on the control wheel is aligned with the snap ring groove in the positioning clamp, and gently rotate or push the control wheel so that the third fixed buckle protrusion can be smoothly clamped into the snap ring groove. In this way, the stable connection between the control wheel, the positioning clamp and the fixed disk is completed.

As shown in FIGS. 2 to 5, in this embodiment, a positioning component 3400 is provided between the positioning clamp 2200 and the control wheel 3300. The positioning component 3400 includes a positioning part 3410 and a tooth part 3420, and a positioning groove 3430 is provided at one end of the positioning clamp 2200 near the control wheel 3300. The positioning part 3410 is provided in the positioning groove 3430, and the tooth part 3420 is arranged at one end of the control wheel 3300 close to the positioning clamp 2200 and is engaged with the positioning part 3410, and the tooth part 3420 is arranged in an annular shape.

In order to further optimize the connection stability and rotation accuracy between the control wheel and the positioning clamp in the acoustic lamp with the handle, this embodiment introduces the design of the positioning component between the two. The positioning component realizes the accurate positioning and reliable connection between the control wheel and the positioning clamp through the cooperation of the positioning part and the tooth part.

At one end of the positioning clamp close to the control wheel, there is a positioning groove. The shape and size of this positioning groove are well designed to ensure that the positioning part can be stably installed therein. The positioning part is arranged in the positioning groove, and its shape and size are matched with the positioning groove to ensure the close fit between them. The main function of the positioning part is to provide a surface that interacts with the tooth part of the control wheel to achieve accurate positioning. At one end of the control wheel close to the positioning clamp, a group of annular tooth parts are arranged. These tooth parts are annularly distributed and concentric with the rotating shaft of the control wheel. The shape and size of the tooth parts are matched with the positioning part, so as to ensure that the control wheel can be engaged with the positioning part when rotating.

When the acoustic lamp needs to be assembled, firstly, the positioning clamp is inserted into the clamp through hole of the lampshade, and the fixed disk is placed in the fixing groove of the lampshade. Then, the control wheel is placed on the positioning clamp to ensure that the tooth parts correspond to the positioning clamp. By rotating the control wheel, the tooth parts will gradually mesh with the positioning part, so as to realize the accurate positioning and reliable connection between the control wheel and the positioning clamp.

As shown in FIGS. 2 to 5, in this embodiment, a positioning post 3350 is provided on the control wheel 3300, and a sliding guide groove 3221 is formed on the transmission pressing part 3220, the sliding guide groove 3221 is set in a shape corresponding to the positioning post 3350, and the positioning post 3350 is arranged in the sliding guide groove 3221.

In order to further improve the connection stability and motion accuracy between the control wheel and the transmission pressing part in the acoustic lamp with the handle, in this embodiment, a positioning post is arranged on the control wheel, and a sliding guide groove with a corresponding shape is formed on the transmission pressing part. Through the cooperation between the positioning post and the sliding guide groove, the precise guidance and stable connection between the control wheel and the transmission pressing part are realized.

On the control wheel, one or more positioning posts are designed. These positioning posts can be cylindrical, prismatic or other suitable shapes, and their size and position are determined according to the sliding guide groove on the transmission pressing part to ensure that they can be accurately matched.

On the transmission pressing part, sliding guide grooves corresponding to the shape of the positioning post are formed. The dimensions and shapes of these sliding guide grooves are precisely designed to ensure that the positioning posts can slide smoothly therein. The sliding guide groove can be set to be linear, arc or other suitable shapes to meet different movement requirements.

When the user operates the control wheel, the positioning post will slide in the sliding guide groove, thus driving the transmission pressing part to move correspondingly. Due to the precise cooperation between the positioning post and the sliding guide groove, the movement of the control wheel will be accurately transmitted to the transmission pressing part, and the precise adjustment of the function of the acoustic lamp will be realized.

As shown in FIGS. 2 to 5, in this embodiment, the transmission pressing part 3220 is provided with an abutting groove 3222, and at least part of the control wheel 3300 is arranged in the abutting groove 3222.

In order to further improve the structural compactness and motion stability between the control wheel and the transmission pressing part in the acoustic lamp with the handle, this embodiment sets an abutting groove on the transmission pressing part, and at least part of the control wheel is arranged in the abutting groove. Through this design, the connection between the control wheel and the transmission pressure piece is closer and the movement is more stable.

One or more abutting grooves are designed on the transmission pressing part. The shape and size of these abutting grooves are designed according to the contour of the control wheel to ensure that the control wheel can be completely or partially embedded therein. The depth and width of the abutting groove are also accurately calculated to ensure the stability and smooth movement of the control wheel therein.

As shown in FIGS. 2 to 5, in this embodiment, a blocking part 2230 is provided at the end of the positioning clamp 2200 far away from the fixed disk 2300, and the blocking part 2230 is used to limit the positioning clamp 2200 from completely passing through the clamp through hole 1110.

At the end of the positioning clamp far from the fixed disk, a blocking part is added. The blocking part can be a convex shape, and its size and shape are carefully designed to ensure that when the positioning clamp is inserted into the clamp through hole, it can contact with the inner wall of the lampshade or a specific structure, thus preventing the positioning clamp from further passing through.

When assembling the acoustic lamp, the user first inserts the positioning clamp into the clamp through hole from the outside of the lampshade and makes it pass through the fixed disk. With the continued insertion of the positioning clamp, the blocking part will contact with the inner wall of the lampshade or a specific structure, generating resistance and limiting the further penetration of the positioning clamp. At this time, the positioning clamp will be firmly fixed between the lampshade and the fixed disk, forming a stable connection structure.

As shown in FIGS. 2 to 5, in this embodiment, a limit hole 1121 is formed in the embedding groove 1120, and a limit post 2320 is protruded on the fixed disk 2300; the limit post 2320 is arranged in a shape corresponding to the limit hole 1121, wherein the limit post 2320 is arranged in the limit hole 1121 when the positioning clamp 2200 passes through the clamp through hole 1110 and is connected with the fixed disk 2300.

One or more limit holes are designed in the fixing groove of the lampshade. The shapes and sizes of these limit holes are accurately calculated to ensure that they can be closely matched with the limit posts on the fixed disk. The position and number of limit holes are determined according to the structure and layout of the fixing groove to achieve the best connection effect.

A limit post corresponding to the limit hole is convexly arranged on the fixed disk. The shapes and sizes of these limit posts are matched with the limit holes to ensure that they can be inserted and fixed in the limit holes smoothly. The number and position of the limit posts correspond to the limit holes, so as to realize stable connection.

As shown in FIGS. 2 to 5, in this embodiment, a back cover 2400 is provided at one end of the handle 2000 far away from the control panel, a fourth fixed buckle protrusion 2500 and a fixing groove 2600 are provided on the handle 2000, and a fixing post 2410 and a buckle groove 2420 are provided on the back cover 2400, and the fixing post 2410 is arranged in a shape corresponding to the fixing groove 2600. The buckle groove 2420 is set in a shape corresponding to the fourth fixed buckle protrusion 2500, wherein the handle 2000 and the back cover 2400 are detachably connected through the fourth fixed buckle protrusion 2500, the fixing groove 2600, the fixing post 2410 and the buckle groove 2420.

At the end of the handle away from the control panel, a back cover is designed. The back cover and the handle cooperate with each other to form the handle part of the acoustic lamp. The back cover can be made of the same or similar material as the handle, so as to ensure that the connection between them is stable and the appearance is harmonious.

On the handle, a fourth fixed buckle protrusion and a fixing groove are provided. The fourth fixed buckle projection is an elastic buckle structure, which can be deformed and restored to its original state when subjected to external force. The fixing groove is a structure matched with the fixing post for receiving and fixing the fixing post.

On the back cover, a fixing post and a buckle groove are provided. The shape and size of the fixing post are matched with the fixing groove on the handle, and can be smoothly inserted and fixed in the fixing groove. The buckle groove is a structure matched with the fourth fixed buckle protrusion for receiving and fixing the fourth fixed buckle protrusion.

When the user needs to install the back cover on the handle, he only needs to align the fixing post on the back cover with the fixing groove on the handle and insert the fixing post into the fixing groove. Then, the back cover is pushed towards the handle, so that the fourth fixed buckle protrusion enters the buckle groove. At this time, the fourth fixed buckle protrusion will be deformed by the extrusion of the buckle groove, and when it completely enters the buckle groove, the fourth fixed buckle protrusion will be restored to its original state and locked in the buckle groove, thus realizing the detachable connection between the handle and the back cover.

Figure 6:
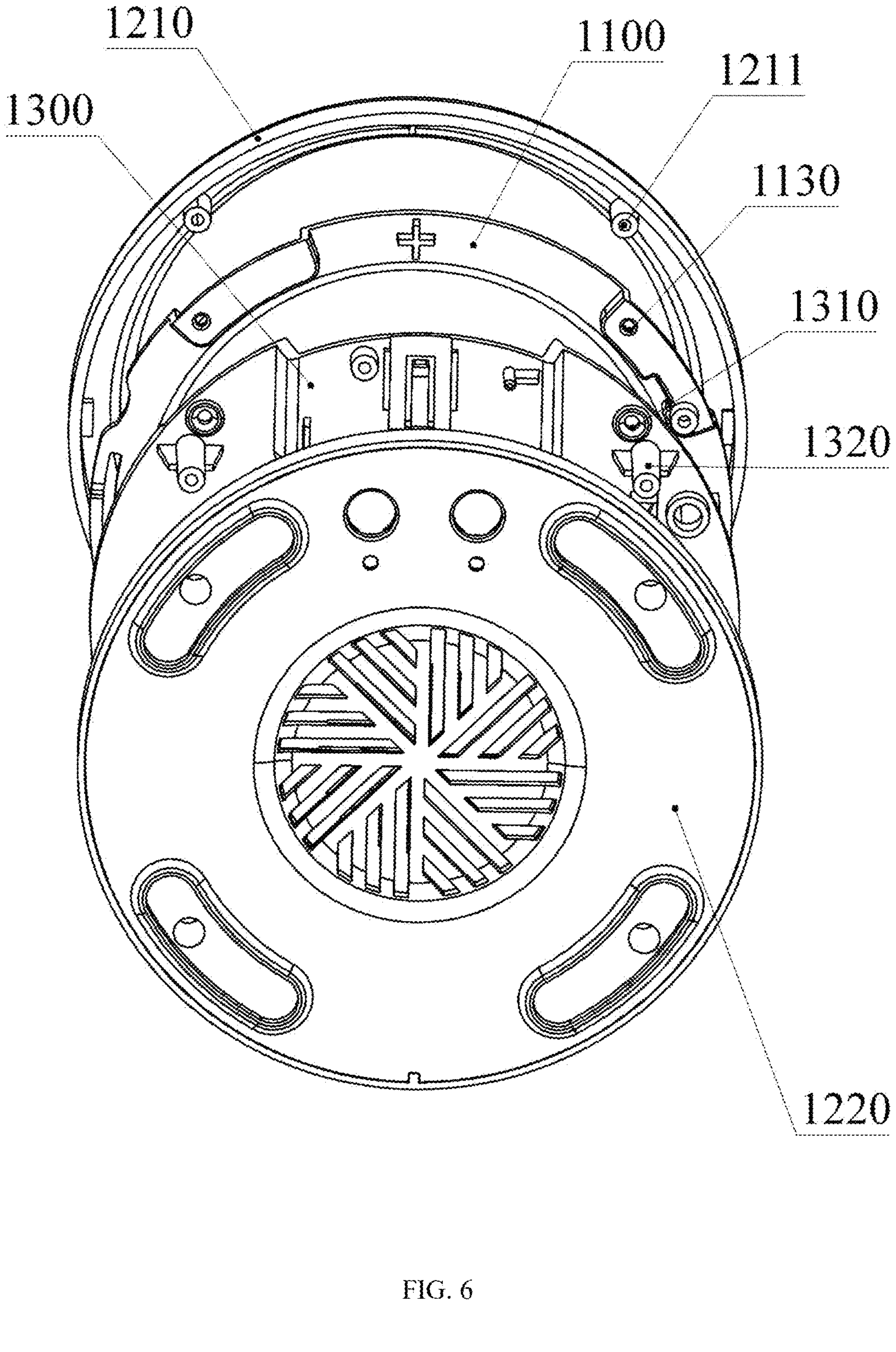
FIG. 6 is a partial explosion of the acoustic lamp with handle.

As shown in FIG. 6, in this embodiment, the base 1200 includes a base housing 1210 and a bottom plate 1220, which is attached to the lower end of the base housing 1210. The base housing 1210 is provided with a first fixing hole 1211, and the lampshade 1100 is provided with a second fixing hole 1130, which corresponds to the first fixing hole 1211, and the upper cover plate 1300 is provided with a third fixing hole. The third fixing hole 1310 corresponds to the second fixing hole 1130, wherein the base housing 1210, the lampshade 1100 and the upper cover plate 1300 are fixedly connected through first fasteners.

As the main structural part of the base, the base housing is attached with a bottom plate at its lower end. The bottom plate can provide additional support and stability, ensuring that the acoustic lamp is placed more smoothly.

The base housing is provided with first fixing holes, and the positions and numbers of these fixing holes are precisely designed according to the structure and size of the base. Second fixing holes are correspondingly arranged on the lampshade, and the positions and sizes of these second fixing holes are matched with the first fixing holes. In addition, the upper cover plate is also provided with third fixing holes, and the positions and sizes of these third fixing holes correspond to the second fixing holes.

The first fasteners are used for fixedly connecting the base housing, the lampshade and the upper cover plate together. These fasteners can be detachable connectors such as bolts and screws, or non-detachable connections such as rivets and welding. In this embodiment, it is recommended to use bolts and nuts as the first fasteners, because they not only provide sufficient connection strength, but also facilitate disassembly and maintenance.

Figure 7:
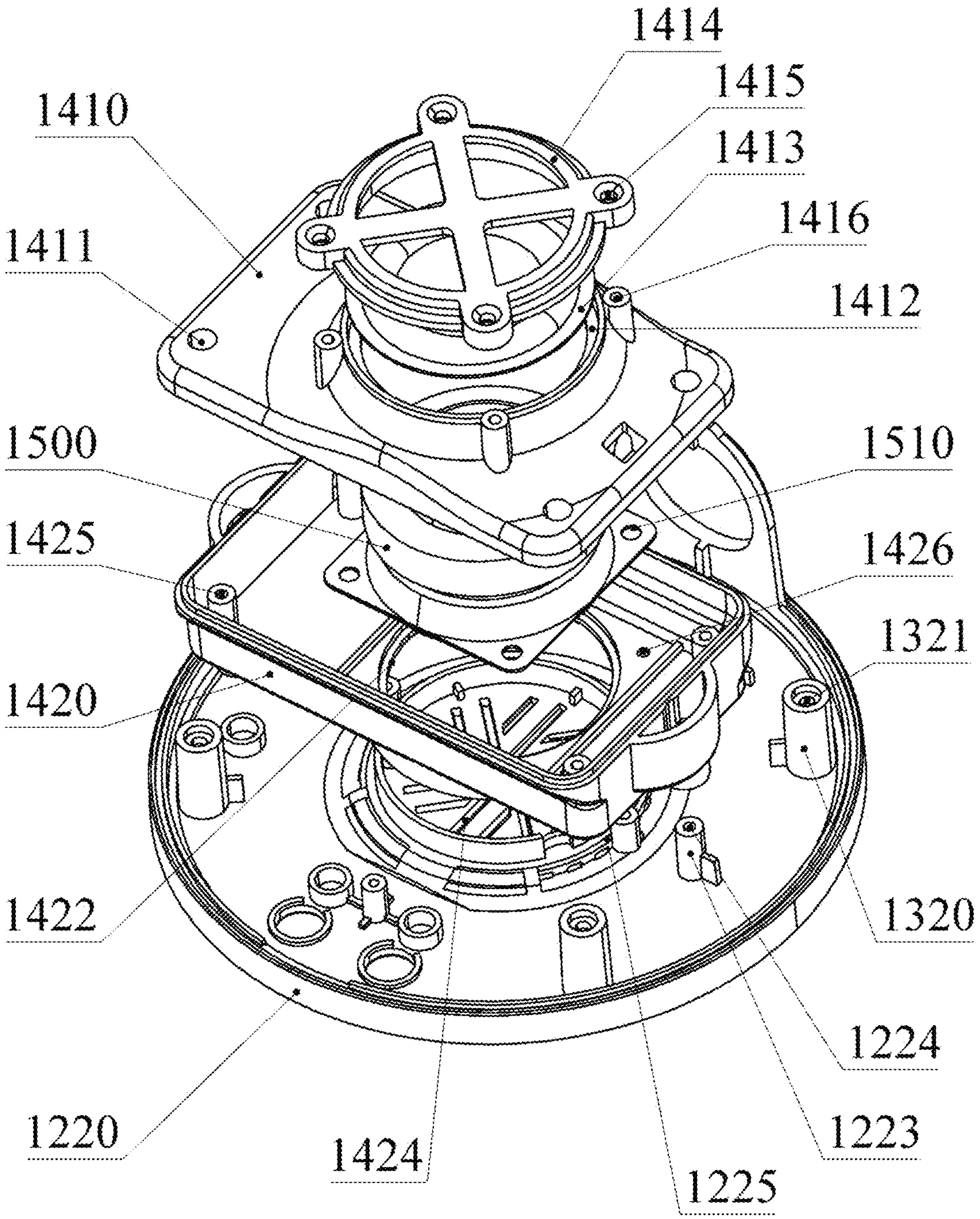
FIG. 7 is a partial explosion of an acoustic lamp with a handle.

As shown in FIGS. 6 to 7, in this embodiment, a first fixing boss 1320 extends downward from the upper cover plate 1300, a second fixing boss 1221 is formed on the bottom plate 1220, and the second fixing boss 1221 at least partially receives the first fixing boss 1320; the first fixing boss 1320 is provided with a fourth fixing hole 1321, and the second fixing boss 1221 is provided with a fourteenth fixing hole 1222. The upper cover plate 1300 and the bottom plate 1220 are fixedly connected through the second fasteners.

One or more first fixing bosses are designed at the lower end of the upper cover plate. These bosses extend downward from the upper cover plate, forming a certain supporting structure. The position and number of the first fixing bosses are determined according to the size and structure of the upper cover plate, so as to ensure good cooperation with the second fixing bosses on the bottom plate.

Second fixing bosses corresponding to the first fixing bosses are designed on the bottom plate. These bosses protrude upward, and their shapes and sizes are matched with the first fixing bosses to receive and support the first fixing bosses. When the upper cover plate is combined with the bottom plate, the first fixing bosses will be partially or completely embedded in the second fixing bosses to form a tight connection.

The first fixing bosses are provided with fourth fixing holes. The position and number of these fixing holes are determined according to the structure and size of the first fixing bosses. Similarly, the fourteenth fixing holes corresponding to the fourth fixing holes are also set on the second fixing bosses. These fixing holes are used to receive the second fasteners to realize the fixed connection between the upper cover plate and the bottom plate.

The second fasteners are an element for fixedly connecting the upper cover plate and the bottom plate together. These fasteners can be detachable connectors such as bolts and screws, or non-detachable connections such as rivets and welding.

Figure 8:
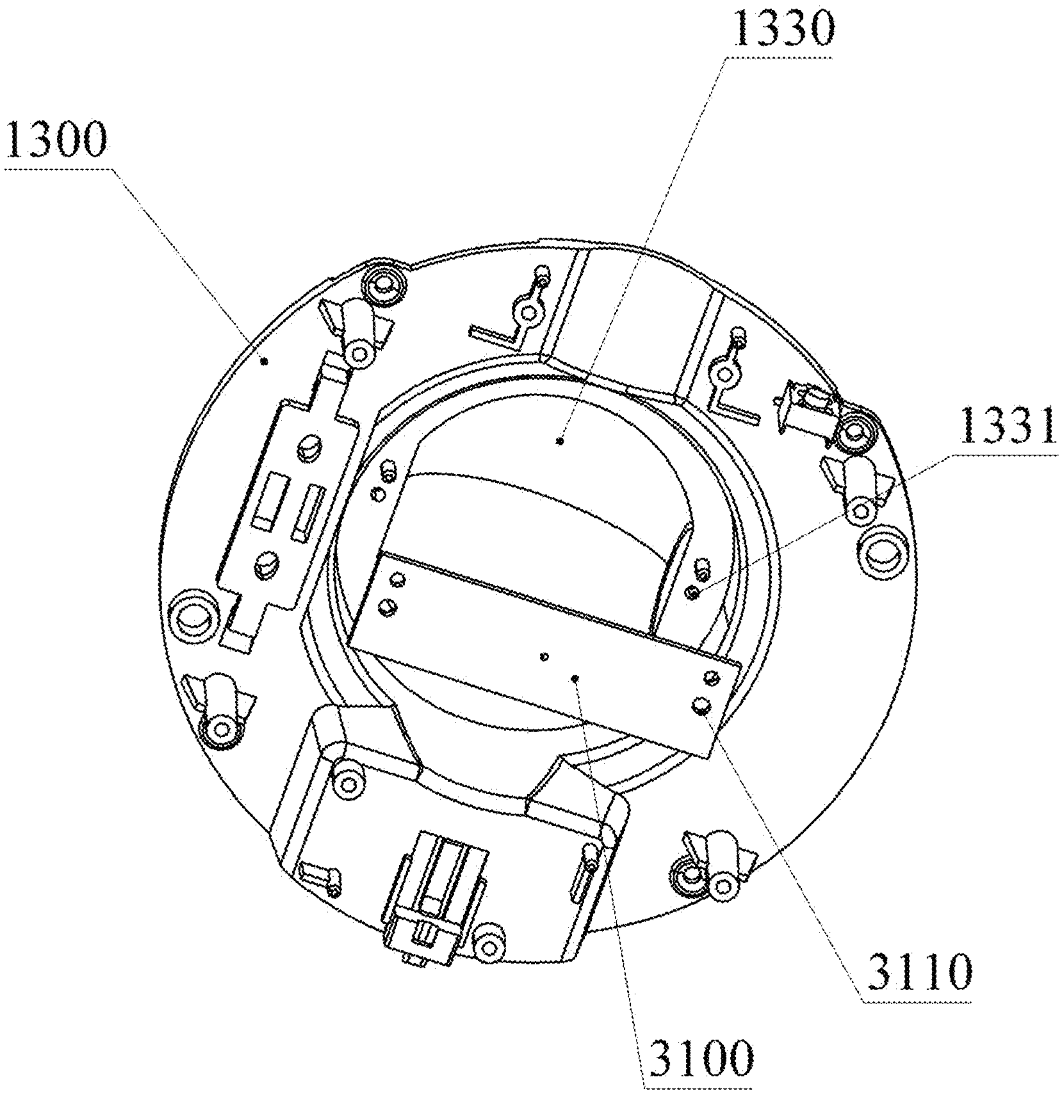
FIG. 8 is a schematic view of an upper cover plate and a light emitting module.
Figure 9:
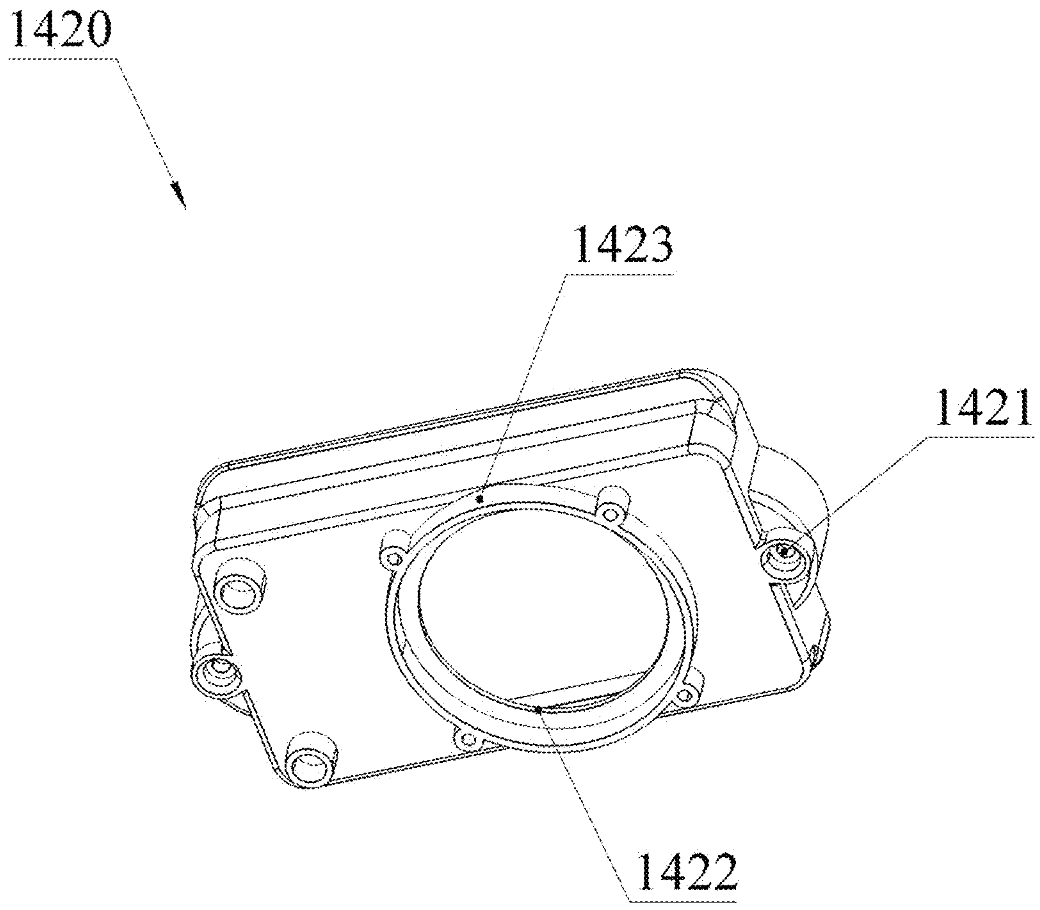
FIG. 9 is a schematic view of the lower shell.

As shown in FIG. 8, in this embodiment, a lamp cap part 1330 is formed on the upper cover plate 1300, a light emitting module 3100 is arranged below the lamp cap part 1330, a fifteenth fixing hole 1331 is arranged on the lamp cap part 1330; a fifth fixing hole 3110 is arranged on the light emitting module 3100, the fifth fixing hole 3110 corresponds to the fifteenth fixing hole 1331, and the light emitting module 3100 is fixedly connected with the lamp cap part 1330 through the third fasteners.

The lamp cap part formed on the upper cover plate is the carrier of the light emitting module, and its shape and size depend on the design requirements of the light emitting module. The lamp cap part usually has a certain depth and opening, which is convenient for the installation of the light emitting module and penetration of the light.

The light emitting module is the lighting component of the acoustic lamp, which is responsible for generating and emitting light. In this embodiment, the light emitting module is installed below the lamp cap part and connected with the lamp cap part through an appropriate fixing structure. The light emitting module can use LED, OLED and other light sources to achieve efficient and energy-saving lighting effect.

In order to ensure the stable position of the light emitting module in the lamp cap part, the fifteenth fixing holes are set in the lamp cap part, and the corresponding fifth fixing holes are set in the light emitting module. The position and number of these fixing holes are determined according to the size and shape of the light emitting module to ensure the stability and reliability of the fixed connection.

The third fasteners are connectors for fixing the light emitting module on the lamp cap, which can be a detachable connecting piece such as bolts, screws and buckles, or a non-detachable connecting way such as rivets and welding.

As shown in FIGS. 2 and 6 to 9, in this embodiment, an acoustic chamber 1400 is provided below the upper cover plate 1300, and an acoustic module 1500 is provided in the acoustic chamber 1400. The acoustic chamber 1400 includes an upper shell 1410 and a lower shell 1420, and a sixth fixing hole 1421 and an lower acoustic opening 1422 are provided in the lower shell 1420; the lower acoustic opening 1422 corresponds to the acoustic module 1500, and an annular boss 1423 is formed on the periphery of the lower acoustic opening 1422 in the direction close to the bottom plate 1220; and a third fixing boss 1223 is formed in the bottom plate 1220 in the direction close to the lower shell 1420, a seventh fixing hole 1224 is formed on the third fixing boss 1223, and the seventh fixing hole 1224 corresponds to the sixth fixing hole 1421; an annular groove 1225 is formed on the bottom plate 1220, and the annular groove 1225 is provided with a shape corresponding to the annular boss 1423, wherein the annular boss 1423 is arranged in the annular groove 1225, and the lower shell 1420 and the bottom plate 1220 are fixedly connected by the fourth fasteners; and a sound outlet 1424 is provided in the lower shell 1420, and the sound outlet 1424 is provided at a position corresponding to the lower acoustic opening 1422 of the sound.

The acoustic chamber is designed as a closed space under the upper cover plate to accommodate the acoustic module. Acoustic module is the core component of acoustic lamp, which is responsible for generating sound. The design of the acoustic chamber is helpful to reduce the loss of sound in the process of transmission and improve the sound quality.

The acoustic chamber consists of an upper shell and a lower shell, which together form a complete closed space. The upper shell is connected with the upper cover plate, while the lower shell is connected with the bottom plate. This design makes the structure of the acoustic chamber more stable and convenient for installation and maintenance.

A sixth fixing hole and a lower acoustic opening are arranged in the lower shell. The lower acoustic opening corresponds to the acoustic module, so as to ensure that the sound can spread to the outside smoothly. On the peripheral edge of the opening under the stereo, an annular boss is formed extending in a direction close to the bottom plate. At the same time, on the bottom plate, a third fixing boss is formed in the direction close to the lower shell, and a seventh fixing hole is arranged thereon. The seventh fixing hole corresponds to the sixth fixing hole, which facilitates the fixed connection between the lower shell and the bottom plate through the fourth fasteners. In addition, an annular groove is also designed on the bottom plate, whose shape matches the annular boss. The annular boss is arranged in the annular groove, which further enhances the connection stability between the lower shell and the bottom plate.

In order to ensure that the sound can spread to the outside smoothly, a sound outlet is set in the lower shell. The sound outlet is arranged at the position corresponding to the lower acoustic opening, so that the sound can be directly transmitted to the external environment through the sound outlet.

As shown in FIGS. 6 to 9, in this embodiment, the upper shell 1410 is provided with an eighth fixing hole 1411, and the lower shell 1420 is provided with a ninth fixing hole 1425 corresponding to the eighth fixing hole 1411, wherein the upper shell 1410 and the lower shell 1420 are fixedly connected by the fifth fasteners.

The acoustic chamber consists of an upper shell and a lower shell, which together form the accommodation space of the acoustic module. The upper shell is connected with the upper cover plate, while the lower shell is connected with the bottom plate, forming a closed structure to protect the acoustic module and optimize the sound quality.

The upper shell is provided with eighth fixing holes, and the positions and numbers of these holes are determined according to the structure and size of the upper shell. At the same time, ninth fixing holes are arranged on the lower shell at positions corresponding to the eighth fixing holes. The design of the eighth fixing holes and the ninth fixing holes ensures that the upper shell and the lower shell can be accurately aligned during component and firmly connected through the fasteners.

The fifth fasteners are elements for fixedly connecting the upper shell and the lower shell together. These fasteners can be detachable connectors such as bolts and screws, or non-detachable connections such as rivets and welding. In this embodiment, it is recommended to use bolts and nuts as the fifth fasteners, because they not only provide sufficient connection strength, but also facilitate disassembly and maintenance.

When assembling the acoustic lamp, first align the upper shell and the lower shell to ensure that the eighth fixing holes and the ninth fixing holes are completely corresponding. Then, use the fifth fasteners (such as bolts and nuts) to pass through the eighth fixing holes and the ninth fixing holes, and tighten the nuts to fix the upper shell and the lower shell. In this way, a firm and fixed connection is formed between the upper shell and the lower shell, thus ensuring the integrity and stability of the acoustic chamber.

As shown in FIGS. 6 to 9, in this embodiment, the acoustic module 1500 is arranged on the lower shell 1420, the acoustic module 1500 is provided with a tenth fixing hole 1510, and the lower shell 1420 is provided with an eleventh fixing hole 1426 corresponding to the tenth fixing hole 1510, wherein the acoustic module 1500 and the lower shell 1420 are fixedly connected through the sixth fasteners.

As the core component of the acoustic lamp, the acoustic module is responsible for generating sound. In this embodiment, the acoustic module is directly installed on the lower shell to ensure that the sound can be directly and efficiently transmitted to the external environment.

The acoustic module is provided with tenth fixing holes, and the positions and numbers of these holes are determined according to the structure and size of the acoustic module. At the same time, eleventh fixing holes are set on the lower shell at the positions corresponding to the tenth fixing holes. The design of the tenth fixing holes and the eleventh fixing holes ensures that the acoustic module and the lower shell can be accurately aligned during component and firmly connected through the fasteners.

The sixth fasteners are elements for fixedly connecting the acoustic module and the lower shell together. These fasteners can be detachable connectors such as bolts and screws, or non-detachable connections such as rivets and welding. In this embodiment, it is recommended to use bolts and nuts as the sixth fasteners, because they not only provide sufficient connection strength, but also facilitate disassembly and maintenance.

When assembling the acoustic lamp, the acoustic module is first placed on the lower shell, and it is ensured that the tenth fixing holes and the eleventh fixing holes are completely corresponding. Then, the sixth fasteners (such as bolts and nuts) are used to pass through the tenth and eleventh fixing holes, and tighten the nuts to fix the acoustic module and the lower case. In this way, the acoustic module is firmly installed on the lower shell, forming a whole with the lower shell.

As shown in FIG. 1, in this embodiment, the base 1200 is provided with a control component 1230 that electrically connects the acoustic module 1500 and the light emitting module 3100, and the control component includes at least one knob 1231 and at least one key 1232.

In order to enhance the user's operating experience and convenience of the acoustic lamp with the handle, this embodiment adds a control component which is electrically connected with the acoustic module and the light emitting module on the base of the acoustic lamp. The control module is exquisitely designed, including at least one knob and at least one key, so that users can easily adjust the sound and lighting effects.

The control module is arranged on the base of the acoustic lamp, which is convenient for users to operate and ensures the aesthetics of the whole product. Users can operate directly without bending over or looking for it, which improves the convenience of use.

The number and function of the knobs in the control component can be designed according to specific requirements. For example, a volume knob can be set to adjust the volume of the sound; a light brightness knob can also be set to adjust the brightness of the light emitting module. The knobs should be designed to feel comfortable and rotate smoothly, so that users can make adjustment easily.

In addition to the knob, the control component also includes at least one key. The function of the key can be customized according to the user's needs, for example, the switch key can be set to control the turn-on and turn-off of the sound and light; switch buttons can also be set to switch between different music modes or lighting modes. The design of keys should ensure clear touch and sensitive response, so that users can complete the operation quickly and accurately.

The control component is electrically connected with the acoustic module and the light emitting module. This connection ensures that the control module can accurately control the output effect of sound and light. In the process of connection, it is necessary to ensure the stability and safety of the connection line to prevent short circuit or damage to the equipment.

As shown in FIGS. 6 to 9, in this embodiment, an upper acoustic opening 1412 is provided on the upper shell 1410, and the upper acoustic opening 1412 is provided at a position corresponding to the acoustic module 1500. A vibrating membrane 1413 and a protective cover 1414 are provided on the lower acoustic opening 1422, and the vibrating membrane 1413 is provided between the protective cover 1414 and the upper shell 1410; a twelfth fixing hole 1415 is provided on the protective cover 1414, and the upper shell 1410 is provided with a thirteenth fixing hole 1416 corresponding to the twelfth fixing hole 1415, wherein the upper shell 1410, the vibrating membrane 1413 and the protective cover 1414 are fixedly connected by the seventh fasteners.

On the upper shell, an upper acoustic opening is provided corresponding to the position of the acoustic module. This opening allows the sound to spread directly from the acoustic module to the external environment, reducing the loss and distortion of the sound in the propagation process.

A combined structure of a vibrating membrane and a protective cover is arranged on the lower acoustic opening. The vibrating membrane is a kind of membrane that can vibrate with the sound waves generated by the acoustic module, which can enhance the sound diffusion effect and low-frequency response. The protective cover is located on the vibrating membrane to protect the vibrating membrane from external factors such as dust and moisture.

The twelfth fixing hole is set on the protective cover, and the thirteenth fixing hole is set on the upper shell corresponding to the twelfth fixing hole. The design of these two fixing holes ensures that the protective cover can be firmly installed on the upper shell and form a complete structure together with the vibrating membrane.

The seventh fasteners are elements for fixedly connecting the protective cover, the vibrating membrane and the upper shell together. These fasteners can be detachable connectors such as bolts and screws, or non-detachable connections such as rivets and welding. In this embodiment, it is recommended to use bolts and nuts as the seventh fasteners, because they not only provide sufficient connection strength, but also facilitate disassembly and maintenance.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. An acoustic lamp with a handle, comprising a handle, a lamp body and a power supply;

wherein the handle is arranged on the lamp body and is rotatably connected with the lamp body, the power supply is fixedly arranged in the lamp body, and the lamp body further comprises a light emitting module and a light control component;

the light control component comprises a control wheel and an elastic button, wherein the control wheel is fixedly connected to the handle and abuts against the elastic button;

the control wheel further comprises a convex part, and when the control wheel is configured to be driven to rotate by the handle, the elastic button has a compressed state abutting against the convex part and an extended state disengaging from the convex part;

wherein, the light emitting module is electrically connected with the power supply through the elastic button, and a circuit between the power supply and the light emitting module can be disconnected and connected by pressing the elastic button; and wherein the control wheel is connected with the handle and is configured to operate the light control component through the handle.

2. The acoustic lamp with a handle according to claim 1, wherein the light control component comprises an elastic control part and a control wheel, and the elastic control part is fixed in the lamp body and electrically connected with the light emitting module; and the control wheel is fixedly connected to the handle and abuts against the elastic control part; the control wheel comprises a convex part and a wheel part, and the control wheel abuts against the elastic control part through the convex part and the wheel part, so that the elastic control part is in the compressed state or the extended state; and the lamp body comprises a lampshade and a base; an upper cover plate is arranged in the base; the upper cover plate is fixedly connected with the lampshade; the elastic control part comprises the elastic button and a transmission pressing part; the transmission pressing part penetrates the upper cover plate and abuts against the control wheel; the elastic button is arranged between the transmission pressing part and the upper cover plate; and the elastic button is electrically connected with the light emitting module.

3. The acoustic lamp with a handle according to claim 2, wherein a first fixed buckle protrusion is formed on the control wheel extending in a direction close to the handle, and a first buckle through-hole corresponding to the first fixed buckle protrusion is formed on the handle, wherein the control wheel and the handle are detachably connected through the first fixed buckle protrusion and the first buckle through-hole.

4. The acoustic lamp with a handle according to claim 3, wherein a positioning clamp and a fixed disk are arranged between the control wheel and the handle; a clamp through hole and a fixing groove are formed on the lampshade, and clamp through-hole corresponds to the positioning clamp; the positioning clamp penetrates through the clamp through-hole, the fixing groove corresponds to the fixed disk, and the fixed disk is located in the fixing groove; and a second fixed buckle protrusion is formed on the positioning clamp along the direction close to the handle, and a second buckle through-hole corresponding to the second fixed buckle protrusion is formed on the fixed disk, wherein the positioning clamp and the fixed disk are detachably connected through the second fixed buckle protrusion and the second buckle through-hole.

5. The acoustic lamp with a handle according to claim 4, wherein the first fixed buckle protrusion penetrates through the positioning clamp and the fixed disk, and a third fixed buckle protrusion is formed on the control wheel along a direction close to the positioning clamp; and a snap ring groove corresponding to the third fixed buckle protrusion is formed in the positioning clamp, wherein the positioning clamp and the control wheel are detachably connected through the third fixed buckle protrusion and the snap ring groove.

6. The acoustic lamp with a handle according to claim 5, wherein a positioning component is arranged between the positioning clamp and the control wheel, and the positioning component comprises a positioning part and a tooth part; a positioning groove is arranged at one end of the positioning clamp near the control wheel, and the positioning part is arranged in the positioning groove; the tooth part is arranged at one end of the control wheel near the positioning clamp and is engaged with the positioning part; and the tooth part is arranged in an annular shape.

7. The acoustic lamp with a handle according to claim 6, wherein a positioning post is arranged on the control wheel, and a sliding guide groove is formed on the transmission pressing part; and the sliding guide groove is arranged in a shape corresponding to the positioning post, and the positioning post is arranged in the sliding guide groove.

8. The acoustic lamp with a handle according to claim 7, wherein an abutting groove is formed on the transmission pressing part, and at least part of the control wheel is arranged in the abutting groove.

9. The acoustic lamp with a handle according to claim 8, wherein a blocking part is arranged at one end of the positioning clamp far from the fixed disk, and the blocking part is used for limiting the positioning clamp from completely passing through the clamp through hole.

10. The acoustic lamp with a handle according to claim 9, wherein a limit hole is formed in the fixing groove, and a limit post is protruded on the fixed disk, and the limit post is set in a shape corresponding to the limit hole, wherein when the positioning clamp passes through the clamp through-hole and is connected with the fixed disk, the limit post is arranged in the limit hole.

11. The acoustic lamp with a handle according to claim 10, wherein a rear cover is arranged at one end of the handle far from a control panel, and a fourth fixed buckle protrusion and a fixing groove are arranged on the handle, and a fixing post and a buckle groove are arranged on the rear cover; and the fixing post is arranged in a shape corresponding to the fixing groove, and the buckle groove is arranged in a shape corresponding to the fourth fixed buckle protrusion, wherein the handle and the rear cover are detachably connected through the fourth fixed buckle protrusion, the fixing groove, the fixing post and the buckle groove.

12. The acoustic lamp with a handle according to claim 2, wherein the base comprises a base housing and a bottom plate, the bottom plate is attached to a lower end of the base housing; a first fixing hole is arranged on the base housing, a second fixing hole is arranged on the lampshade, and a third fixing hole is arranged on the upper cover plate; and the third fixing hole corresponds to the second fixing hole, wherein the base housing, the lampshade and the upper cover plate are fixedly connected through first fasteners.

13. The acoustic lamp with a handle according to claim 12, wherein the upper cover plate extends downward to form a first fixing boss, a second fixing boss is formed on the bottom plate, and the second fixing boss at least partially receives the first fixing boss; and the first fixing boss is provided with a fourth fixing hole, and the second fixing boss is provided with a fourteenth fixing hole, and the upper cover plate and the bottom plate are fixedly connected through second fasteners.

14. The acoustic lamp with a handle according to claim 13, wherein a lamp cap part is formed on the upper cover plate, a light emitting module is arranged below the lamp cap part, and a fifteenth fixing hole is arranged on the lamp cap part; and a fifth fixing hole is arranged on the light emitting module, and the fifth fixing hole corresponds to the fifteenth fixing hole, and the light emitting module is fixedly connected with the lamp cap part through third fasteners.

15. The acoustic lamp with a handle according to claim 14, wherein an acoustic chamber is arranged below the upper cover plate, and an acoustic module is arranged in the acoustic chamber; the acoustic chamber comprises an upper shell and a lower shell, and a sixth fixing hole and an lower acoustic opening are arranged in the lower shell, and the lower acoustic opening corresponds to the acoustic module, and an annular boss is formed at the periphery of the lower acoustic opening along a direction close to the bottom plate; and a third fixing boss is formed in the bottom plate in a direction close to the lower shell, a seventh fixing hole is formed on the third fixing boss, and the seventh fixing hole corresponds to the sixth fixing hole; an annular groove is formed on the bottom plate, and the annular groove is provided with a shape corresponding to the annular boss, wherein the annular boss is arranged in the annular groove, and the lower shell and the bottom plate are fixedly connected through fourth fasteners; and a sound outlet is arranged in the lower shell, and the sound outlet is arranged at a position corresponding to the lower acoustic opening.

16. The acoustic lamp with a handle according to claim 15, wherein the upper shell is provided with an eighth fixing hole, and the lower shell is provided with a ninth fixing hole corresponding to the eighth fixing hole, wherein the upper shell and the lower shell are fixedly connected through fifth fasteners.

17. The acoustic lamp with a handle according to claim 16, wherein the acoustic module is arranged on the lower shell, and is provided with a tenth fixing hole; and the lower shell is provided with an eleventh fixing hole corresponding to the tenth fixing hole, wherein the acoustic module and the lower shell are fixedly connected through sixth fasteners.

18. The acoustic lamp with a handle according to claim 17, wherein a control component electrically connected with the acoustic module and the light emitting module is arranged on the base, and the control component comprises at least one knob and at least one key.

19. The acoustic lamp with a handle according to claim 18, wherein an upper acoustic opening is arranged on the upper shell, and the upper acoustic opening is arranged at a position corresponding to the acoustic module; a vibrating membrane and a protective cover are arranged on the lower acoustic opening, and the vibrating membrane is arranged between the protective cover and the upper shell; and a twelfth fixing hole is arranged on the protective cover, and a thirteenth fixing hole is arranged on the upper shell, and the thirteenth fixing hole corresponds to the twelfth fixing hole, wherein the upper shell, the vibrating membrane and the protective cover are fixedly connected through seventh fasteners.

20. An acoustic lamp with a handle, comprising a handle, a lamp body and a power supply;

wherein the handle is arranged on the lamp body and is rotatably connected with the lamp body, the power supply is fixedly arranged in the lamp body, and the lamp body further comprises a light emitting module, a lighting control component, and a positioning component;

the lighting control component comprises a control wheel and an elastic button, wherein the control wheel is fixedly connected to the handle and abuts against the elastic button, and the light emitting module is electrically connected with the power supply through the elastic button; and the positioning component comprises a positioning clamp, a positioning part and a tooth part, wherein the positioning clamp is fixedly arranged in the lamp body; a positioning groove is arranged at one end of the positioning clamp close to the control wheel; the positioning part is arranged in the positioning groove; and the tooth part is arranged at one end of the control wheel close to the positioning clamp and is engaged with the positioning part.

* * * * *